US009385930B2

(12) United States Patent
Gudipati et al.

(10) Patent No.: US 9,385,930 B2
(45) Date of Patent: Jul. 5, 2016

(54) METHOD TO DETECT SUBOPTIMAL PERFORMANCE IN BOUNDARY CLOCKS

(71) Applicant: CISCO TECHNOLOGY, INC., San Jose, CA (US)

(72) Inventors: Shashank Gudipati, Bangalore (IN); Sathis Kumar Murugesan, Bangalore (IN); Mahendran Sithanantham, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 43 days.

(21) Appl. No.: 14/080,577

(22) Filed: Nov. 14, 2013

(65) Prior Publication Data

US 2015/0131682 A1    May 14, 2015

(51) Int. Cl.
*H04L 7/00* (2006.01)
*H04L 12/26* (2006.01)
*H04J 3/06* (2006.01)
*H04J 3/14* (2006.01)

(52) U.S. Cl.
CPC ........... *H04L 43/0823* (2013.01); *H04J 3/0673* (2013.01); *H04J 3/14* (2013.01); *H04J 3/0667* (2013.01)

(58) Field of Classification Search
CPC . H04L 7/0054; H04L 43/0823; H04J 3/0673; H04J 3/14; H04J 3/0667
USPC ............................ 370/304, 498; 375/354–368
See application file for complete search history.

(56) References Cited

U.S. PATENT DOCUMENTS 6,295,541 B1 * 9/2001 Bodnar et al.
7,800,534 B1 * 9/2010 Yenney ................. G01S 19/215
                                                    342/357.54

OTHER PUBLICATIONS

Han, Jiho, et al., "Practical considerations in the design and implementation of time synchronization systems using IEEE 1588," IEEE Communications Magazine, vol. 47, Issue 11, Nov. 2009 [Abstract Only]   http://ieeexplore.ieee.org/xpl/login.jsp?tp=&arnumber=53074818&url=http%3A%2F%2Fieeexplore.ieee.org%2Fxpls%2Fabs_all.jsp%3Farnumber%3D5307481.
Kohler, D., "A Practical Implementation of an IEEE 1588 supporting Ethernet Switch," IEEE International Symposium on Precision Clock Synchronization for Measurement, Control and Communication, ISPCS Oct. 2007 [Abstract Only] http://ieeexplore.ieee.org/xpl/login.jsp?tp=&arnumber=4383787&url=http%3A%2F%2Fieeexplore.ieee.org%2Fxpls%2Fabs_all.jsp%3Farnumber%3D4383787.

* cited by examiner

*Primary Examiner* — Mang Yeung
(74) *Attorney, Agent, or Firm* — Patent Capital Group (57) ABSTRACT

In one example embodiment, a method to detect suboptimal boundary clocks is described for a node in a communications network. The method can include determining a benchmark value for a clock in a node; generating a plurality of time correction parameters associated with a plurality of time corrections for the clock; determining whether the plurality of time correction parameters meets a predetermined criteria based on the benchmark value; and generating an alert if the plurality of time correction parameters meets the predetermined criteria.

20 Claims, 4 Drawing Sheets

METHOD TO DETECT SUBOPTIMAL PERFORMANCE IN BOUNDARY CLOCKS

TECHNICAL FIELD

This disclosure relates in general to network nodes and, more particularly, to a method and an apparatus for detecting suboptimal clock synchronization between nodes in a communications network.

BACKGROUND

Switching nodes are used in communications networks to switch and route data traffic between sources and destinations. A switching node typically receives data traffic in the form of data packets as input at interface ports (ingress of the node) and outputs the data packets as output at interface ports (egress of the node) to direct the data packets to an appropriate destination in the communications network. The switching nodes of a network may each include a clock to maintain local time at the node. The nodes maintain time synchronization through each node synchronizing as a slave node to a master node that maintains a master clock. The nodes synchronize by monitoring selected IP packets sent by the master node. The selected IP packets are time stamped with master clock time when sent from the master node and time stamped with slave clock time when received at the slave node. By knowing the transmission time delay between the master and slave nodes, a time correction value may be calculated at the slave node and the clock of the slave node may be corrected.

Certain protocols for synchronizing master and slave clocks of nodes in a network provide correction values generated at the slave node, the correction values themselves provide limited information. In network data monitoring centers, the information available only shows corrections generated at slave nodes. However, there is no procedure to auto-detect abnormal changes in the synchronization process that may indicate other problems in the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method and an apparatus for detection of suboptimal boundary clocks are described in the example embodiments of this disclosure. The detection of suboptimal boundary clocks may be used, for example, as an indication of problems in the node or network. In example embodiments, detection of suboptimal boundary clocks is performed by determining a benchmark value for a clock in a node; generating a plurality of time correction parameters associated with a plurality of time corrections for the clock; determining whether the plurality of time correction parameters meets a predetermined criteria based on the benchmark value; and generating an alert if the plurality of time correction parameters meets the predetermined criteria.

Example Embodiments

Figure 1A:
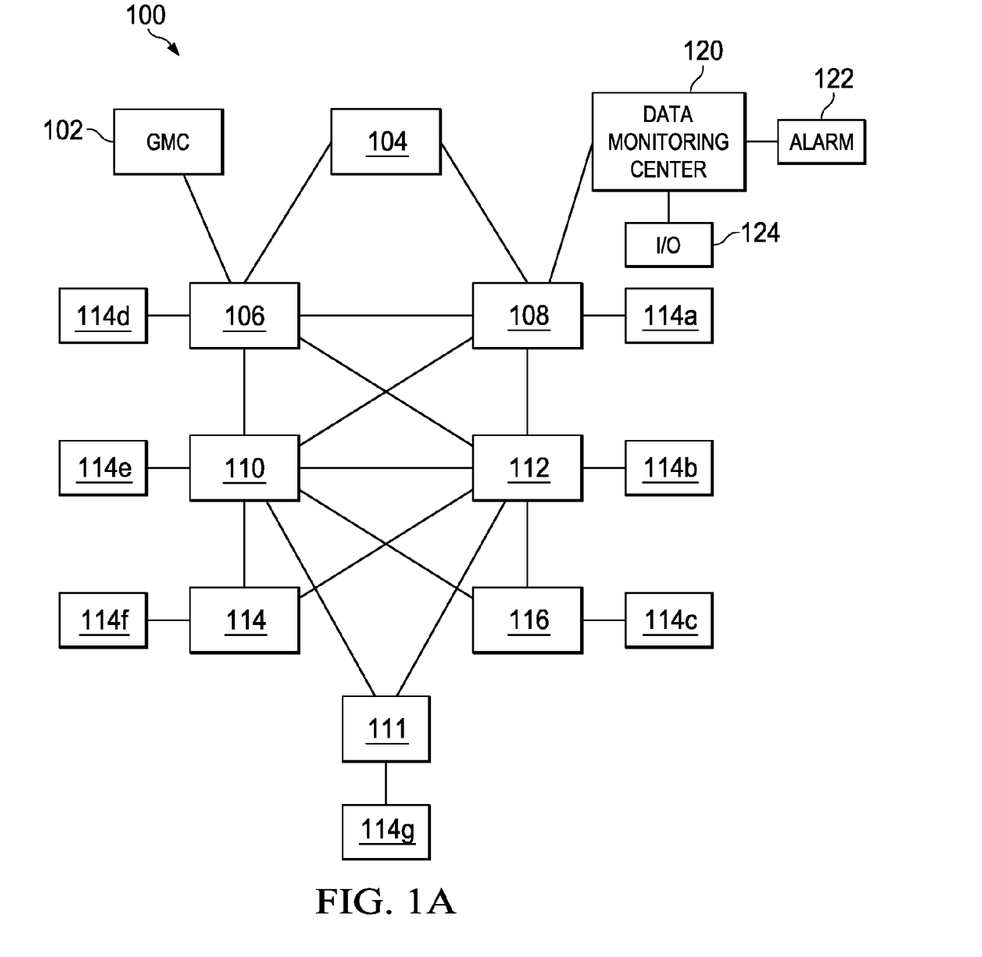
FIG. 1A is a simplified block diagram illustrating a network into which an example embodiment of the disclosure may be implemented.

Referring to FIG. 1A, therein is a simplified block diagram illustrating a network into which an example embodiment of the disclosure may be implemented. FIG. 1A shows a communication network 100 which includes nodes 104-116, hosts 114a-114g, grand master clock (GMC) 102, and data monitoring center 120 having input/output (I/O) 124 and alarm 122. The nodes may comprise switches or routers that route data or IP packet traffic between the hosts 114a-114g or between the hosts 114a-114g and hosts in other networks similar to communication network 100. Hosts 114a-114g may comprise, for example, end user computers, computing devices, mobile devices, servers, storage devices, or any other type of appliance or apparatus that may interface with an IP network.

Data monitoring center 120 can provide the control and monitoring functions of communication network 100 that allows network administrators to control and monitor network operation. The network administrators may interface with the data monitoring center through I/O 124. In accordance with one non-limiting example embodiment, a switch such as Cisco® Nexus 7000 may be used to implement node 104 and a Cisco® N5000 may be used to implement each of nodes 106-116.

The method and apparatus will now be described by use of example embodiments. The example embodiments are presented in this disclosure for illustrative purposes, and not intended to be restrictive or limiting on the scope of the disclosure or the claims presented herein. In at least one embodiment, communication network 100 can be configured for determining a benchmark value for a clock in a node; generating a plurality of time correction parameters associated with a plurality of time corrections for the clock; determining whether the plurality of time correction parameters meets a predetermined criteria based on the benchmark value; and generating an alert if the plurality of time correction parameters meets the predetermined criteria.

In certain embodiments, the alert may be generated to indicate a detection of suboptimal boundary clocks. The alert may be sent to a data monitoring center of the network in which the node is located. The alert may be used by the data monitoring center to make a determination if the detection of suboptimal boundary clock indicates potential problems with the node and/or network.

In an example embodiment, the benchmark value may be determined by processing time corrections for slave node clock synchronization to master node clock under "ideal conditions." "Ideal conditions" in this broad sense simply means that conditions are not deteriorating or failing in the network. The ideal conditions may be set by processing the time corrections in a predetermined network environment. The particular ideal conditions may be determined and configured, for example, by a network operator in order to determine the benchmark value. In one example embodiment, a plurality of mean values, each mean value being the mean of one of a plurality of sets of a plurality of time corrections, may be calculated under ideal conditions. The benchmark may be set as a threshold having a maximum positive drift and maximum negative drift determined from the plurality of mean values.

In an example embodiment, time corrections used by a slave node clock to synchronize to a master node clock are monitored and saved as the network operates. The time corrections may then be processed to generate a plurality of time correction parameters that are used to determine if predetermined criteria based on the benchmark value are met. The processing of the time corrections may be done, for example, over a number of corrections or over a time period. In one example, the plurality of time correction parameters may each be a mean value of a set of time corrections taken from a plurality of time corrections as the slave node operates in the network. It may be determined if the predetermined criteria based on the benchmark value are met by, for example, by determining if a predetermined percentage of the time correction parameters are outside the thresholds of the maximum positive drift or maximum negative drift values of the benchmark. If the predetermine criteria are met the slave node may then generate an alert.

The broad terms "time correction" or "time correction value" as used in this Specification can include any time difference or correction value relative to a reference time value. This could be, for example, from a source external to a node that is used in the node to correct or adjust the timing of a node clock. The alert may be, for example, any form of message, signal, or indication sent to, or indicated to, a data monitoring center or other destination that causes an indication or alarm to a user or to monitoring apparatus that the predetermined criteria have been met. In alternatives of the method and apparatus, the plurality of time correction parameters may be calculated as any appropriate parameter that allows comparison with a benchmark. In addition, the benchmark used may be any other type of value that is determined based on a predefined set of conditions and is used as a basis for determining if time corrections meet a predetermined criteria during network operation. In alternative embodiments, other predetermined criteria may also be used depending on the benchmark value.

In operation of an example embodiment of FIG. 1A, each of the nodes 104-116 includes a clock that used to track local time in the node. Each of the local clocks is synchronized as a slave clock to a master reference clock in a neighboring node, which in turn may synchronized to one of its neighboring nodes as a master clock or to the grand master clock (GMC) 102, depending on network topology. For example, node 106 may synchronize its clock as a slave directly to GMC 102 and node 108 may synchronize its clock as a slave to the clock of master node 106. Each of the other nodes may be a slave node or a master node to another node in a similar fashion. In synchronizing its clock as a slave clock, each node determines a time difference between the reference master clock and the slave clock. Time corrections based on the time difference are then used to adjust the slave clock to synchronize with the master clock. In the example embodiment, the synchronization process may be realized by a process of precision time protocol (PTP) in which timing information is distributed among nodes of the network through IP packets. In PTP, IP packets are stamped with a time stamp based on the local clock time as the packets enter the ingresses or exit the egresses of the nodes. A node that needs to synchronize its local clock to a master clock runs an algorithm that continuously monitors IP packets and the timestamps contained within that are received from the node with the master clock. By knowing the time delay between the master node and slave node the slave node can determine the time difference between the master clock and the slave clock and generate time corrections to adjust the slave clock. In the example embodiment, the PTP process may be performed according to the IEEE 1588 Precision Time Protocol standard.

Note that in one particular embodiment, the teachings of the present disclosure include applying the aforementioned techniques to PTP performance, especially so in defining a method to detect suboptimal PTP performance. Hence, the protocols outlined herein can apply to automated/unattended flagging of suboptimal PTP performance. For example, certain hard-coded constants, discussed below in greater detail, can readily be generalized (e.g., to a suitable percentage of observed readings). By supplying optional parameters that override defaults (such as 100), the processes discussed herein are appropriately generalized. In yet other cases, the disclosed protocols can be readily integrated into a final step to raise an alert when a suboptimal PTP performance is detected. Additionally, a query mechanism may be provided by the architecture that reflects a pass/fail response to an external PTP performance quality query.

Figure 1B:
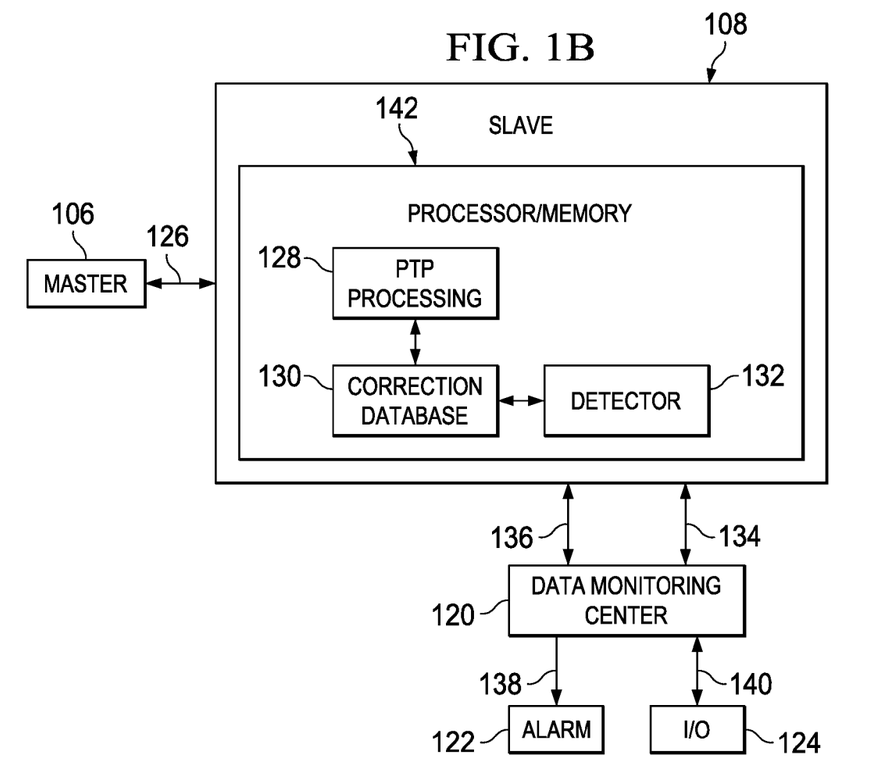
FIG. 1B is a simplified block diagram illustrating functional blocks of a node in accordance with an example embodiment of the disclosure.

Referring now to FIG. 1B, therein is a simplified block diagram illustrating functional blocks of a node 108 in accordance with an example embodiment of the disclosure. FIG. 1B shows node 108 of communication network 100 FIG. 1A as an example of how the functions of the embodiment may be implemented in any of the nodes 104-116 of FIG. 1A. In the example embodiment, node 108 may implemented as the slave node to node 106. Node 108 comprises processors/memory 142, and functional blocks PTP processing 128, correction database 130 and detector 132. The functional blocks of PTP processing 128, correction database 130 and detector 132, may be implemented by an implementation of processors/memory 142 in an appropriate combination of hardware and/or software or a software application that is configured to provide and perform the functions. Processors/memory 142 may comprises one or more processors that maybe implemented in any form of circuitry and/or software configured to implement the functions of PTP processing 128, correction database 130 and detector 132 in node 108.

Node 108 is coupled at interface 126 to node 106 that, in the example embodiment, serves as the master clock node to node 108. Node 108 is also coupled to data monitoring center 120 at interfaces 134 and 136. In the embodiment, node 108 receives IP packets on interface 126 that are time stamped according to the master clock of node 106 when sent from the egress of the node 106. PTP processing block 128 may process the received packets, for example, according to the IEEE 1588 PTP standard using a clock servo algorithm that continuously monitors the packets, in order to synchronize the local slave clock of node 108 to the master clock of node 106. According to the example embodiment, time corrections generated in the PTP process may be stored in the correction database 130 and processed by the detector 132. The detector 132 processes the time correction data in correction database 130 according to the example embodiments of the disclosure in order to detect suboptimal boundary clocks. Upon detection of suboptimal boundary clocks, detector may generate an alert to data monitoring center 120, which may then generate an alarm 122 or other information at I/O 124 to alert network administrators of potential problems in the node or network. The alert may be, for example, in the form of a syslog or simple network management protocol (SNMP) trap. The example embodiments allow abnormal PTP behavior to be reported to administrators without the use of any external testing devices. Administrators can define the threshold value based on business needs.

By monitoring appropriate data and detecting changes in the quality of PTP synchronization performance utilizing the embodiments of the disclosure the administrators are able to further probe or ignore a detected change in PTP quality. A detection of suboptimal boundary clocks may for example, detect when a master clock becomes disconnected from the slave or when there is a change in the clock class of the master node clock. Detection of suboptimal boundary clocks may also detect congestion in the network between the master and slave nodes that is causing undesired path delay or timing packet loss, or detect disconnection of physical media such as cables, or detect bad transceivers or transceivers going down between the master node and slave node. Additional events that may be detected include any other event that causes a change in PTP quality, for example, faults in PTP hardware such as the packet time stamping unit at egress/ingress ports or temperature and pressure changes near the relevant clock.

Detector 132 may process the time corrections stored in database 130 using a benchmark value for the clock in node 108. As node 108 functions in communication network 100 and as the PTP process runs in node 108, detector 132 may generate a plurality of time correction parameters associated with the plurality of PTP time corrections for the clock of node 108. Detector 132 may then determine whether the plurality of time correction parameters meets a predetermined criteria based on the benchmark value, and if the predetermined criteria is met, generate an alert to the data monitoring center.

There are a number of factors that might affect the best case performance of PTP in boundary clocks. These changes in performance may be small and hard to detect. The disclosed embodiments provide a data driven approach that utilizes the PTP corrections received at a slave clock to detect a drift in slave clock synchronization. For example, PTP time corrections may be random in value. The time correction values received as corrections may not repeat. This might happen because of factors that are not controllable such as network bandwidth, clock oscillations, temperature, cable length, inconsistent hardware time stamping at the nanosecond level, etc. This makes it difficult to arrive at tight bounds between various PTP performance states.

The disclosed embodiments provide an alternative for detecting anomalies in PTP synchronization, by classifying "ideal" PTP behavior as a benchmark. By benchmarking performance based on PTP corrections, comparison of parameters allows detection of errors in synchronization. The difference in time between master and slave clocks may keep oscillating. The PTP corrections (positive and negative) climb and fall at regular intervals. The PTP process prevents a slave clock from drifting away from synchronization with a master clock. When a Slave clock drifts beyond a particular range, it is brought back to average drift by providing a larger correction. A set of diverging and converging values form a cycle. The embodiments of the disclosure utilize these recurring cycles, to benchmark a PTP device.

Figure 2:
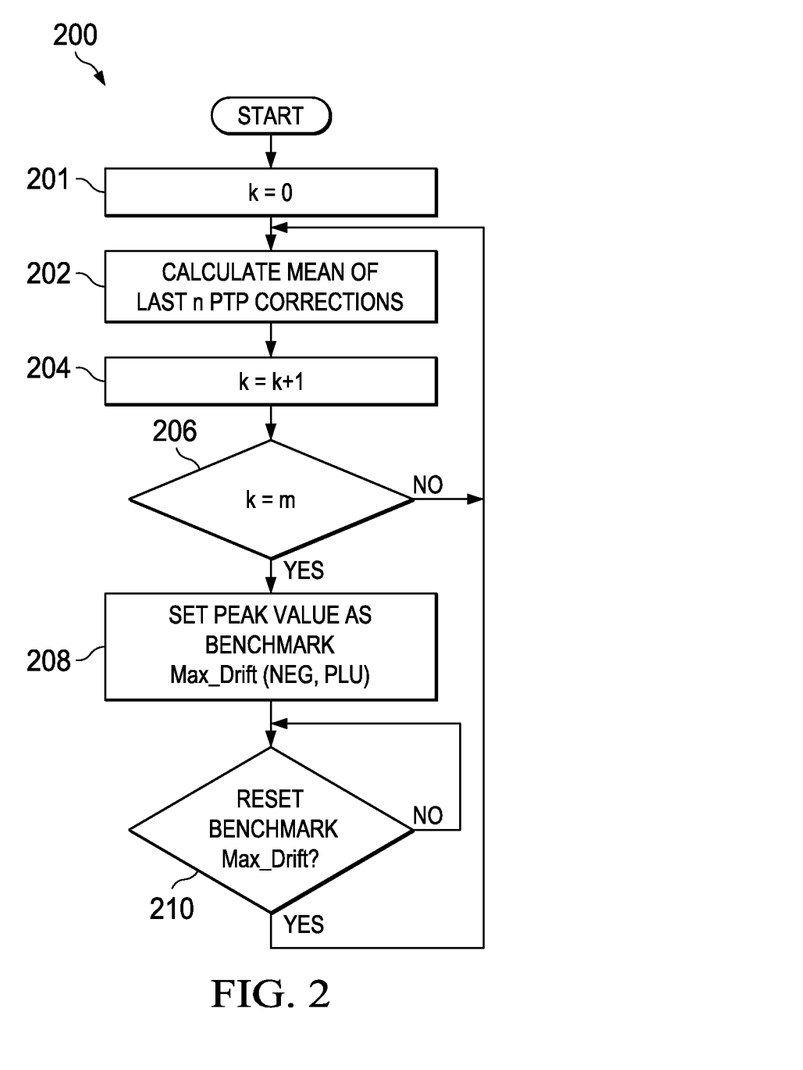
FIG. 2 is a simplified flow diagram illustrating operations that may be associated with a process for setting a benchmark in accordance with an example embodiment of the disclosure.

Referring now to FIG. 2, therein is a simplified flow diagram 200 illustrating operations that may be associated with a process for determining a benchmark in accordance with an example embodiment of the disclosure. FIG. 2 shows an example process performed by detector 132 in setting a benchmark that may be used in a process of detecting suboptimal boundary clocks. The benchmark value may be determined for a slave clock by processing time corrections through the process for slave node clock synchronization to master node clock under "ideal conditions" set according to a predetermined network environment. The benchmark may be topology and configuration dependent and based on network traffic or business requirements. The ideal conditions may be determined and configured, for example, by a network operator on node 108, in order to run the process to determine the benchmark value. Because variance in correction can range from a few nanoseconds to a few hundreds of nanoseconds, the administrators may act on or ignore deviation based on network preferences.

In one example embodiment, the ideal configuration may include configuring the PTP process with predetermined parameters. For example, in one embodiment using the IEEE 1588 PTP for the synchronization, the parameters of IEEE 1588 for the Announce Messages used to build up the synchronization hierarchy, such as the Announce Interval and Announce Timeout messages, and the parameters of the event messages that generate and transport timestamps needed for the PTP process, such as the Sync (Master to slave) and Delay_req (Slave to master) messages, may be set to a predetermined configuration. Message parameters for General messages, such as the Follow_up (Master to slave) and delay_resp (Master to slave) messages, also may be set to predetermined values.

The process 200 of FIG. 2 begins at 201 where an index k is set to 0. The process then moves to 202 where detector 132 calculates the mean of the last n PTP corrections from correction database 130. The correction database 130 is used to store PTP corrections used by node 108 as the PTP process is performed. The value of n may be any value, of appropriate size to generate an appropriate sample for the mean. In one example implementation n may be set at 100. At 204, an index k is incremented. The index k is used to track and set the number of sets of n PTP corrections that are processed to calculate a mean. At 206 it is determined if k equals a value m. The value m is used to set the number of sets of n PTP corrections that are processed at 202. The value of m may be any value, of appropriate size to generate an appropriate sample number of sets to process for the mean. In the example, implementation m may be set at 100. If it is determined, at 206, that k is not equal to m the process moves back to 202 where a mean is calculated for the next set of n PTP corrections.

The process can repeat at 202, 204 and 206 until it is determined at 206 that k equals m. At that point, the detector will have generated m mean values where each mean is calculated from a last set of PTP corrections and the process moves to 208. Detector 132 may time the process appropriately so that the set of last n PTP correction processed at 202 includes n PTP corrections not previously processed. For example, detector 130 may take distinct mean value readings every 10-15 seconds continuously. In the embodiment, the readings may fall into categories in which readings may rise sharply, readings may fall or be at same level for certain values and then rise, or, readings may fall sharply. Readings are taken in all cases. The non-decreasing reading will lead to peak values, positive and negative. These peak values constitute a Max_Drift parameter that may be used to set the benchmark.

Referring again to FIG. 2, at 208 the detector 132 uses the peak mean values from 202 to define a maximum drift (negative maximum mean value (NEG), positive maximum mean value (POS)) as a threshold under the ideal conditions of the predetermined environment set for benchmark generation. The maximum drift (NEG, POS) is then available for use as the benchmark for the clock of node 108. The process then moves to 210 where it is determined if the benchmark needs to be reset. If the benchmark does not need to be reset the process can repeat at 210. If at 210 it is determined that the benchmark needs to be reset the process moves back to 201 and the benchmark is reset over again. The determination at 210 on whether to reset the benchmark may be made based, for example, on determination that events that may affect the benchmark have occurred. For example, it may be determined that new equipment or nodes have been configured in communication network 100 or that node 108 has undergone a software upgrade.

Figure 3:
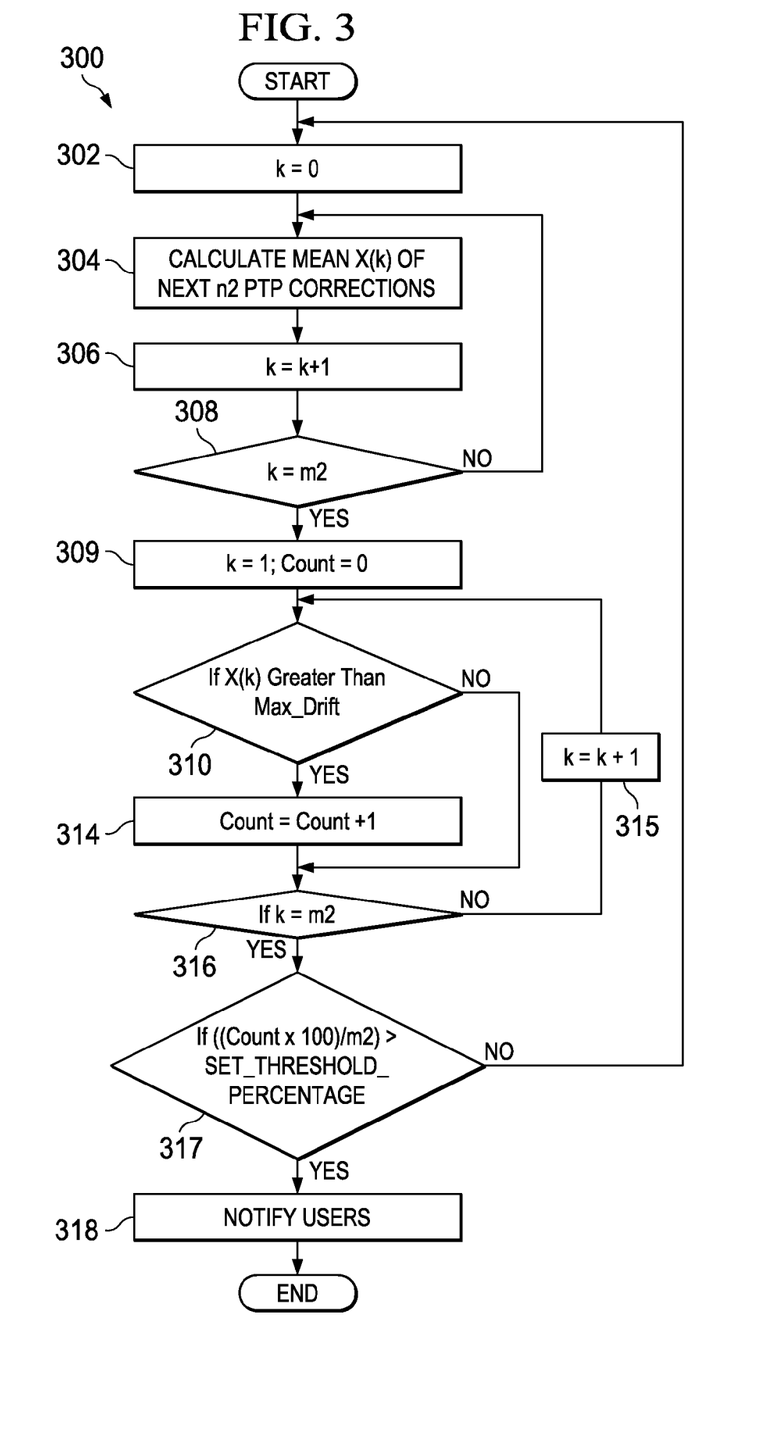
FIG. 3 is a simplified flow diagram illustrating operations that may be associated with a process for monitoring corrections in accordance with an example embodiment of the disclosure.

Referring now to FIG. 3, therein is a simplified flow diagram 300 that illustrates operations that may be associated with a process for monitoring corrections in accordance with an example embodiment of the disclosure. FIG. 3 shows the process performed by detector 132 to monitor PTP corrections as the network operates in normal operation. The process begins at 302 where index k is set to 0. The index k is used to track and set the number of sets of m PTP corrections that are processed to calculate a mean. Next, at 304 the mean of the next n2 PTP corrections is calculated. The value of n2 is a variable and can be any value that allows generation of an appropriate sample for the mean. In one example implementation, n2 may be set at 100. Next at 306, the index k is incremented.

At 308 it is determined if k=m2. The value of m2 may be any value, of appropriate size to generate an appropriate sample number of sets to process for the mean. In one example implementation, m2 may be set at 100. If it is determined, at 308, that k is not equal to m2 the process moves back to 304 where a mean is calculated for the next set of n2 PTP corrections. The process can repeat at 304, 306 and 308 until it is determined at 308 that k equals m2. At that point, the detector will have generated a plurality of time correction parameters comprising m2 mean values where each mean is calculated from a last set of n2 PTP corrections and the process moves to 309. Detector 132 may time the process appropriately so that the set of last n2 PTP correction processed at 304 includes n2 PTP corrections not previously processed or included in the previous mean calculation. For example, detector 130 may take distinct mean value readings every 10-15 seconds continuously. The process uses these results to determine if the plurality of m2 time correction parameters for X (k), where k=1, m2, meets the predetermined criteria of the benchmark calculated in the process of FIG. 2.

At 309 the index k is reset to 0 and the process moves to 310 where it is determined if the mean X(k) calculated at 304 is greater than the Max_Drift parameter set as the benchmark by determining if X(k) is greater than the benchmark Max_Drift (NEG, POS). That is, it is determined if the magnitude of x(k) is greater than the magnitude of Max_Drift (NEG) for negative mean time corrections or if X(k) is greater than Max_Drift (POS) for positive mean time corrections. If X (k) is greater than Max_Drift the process moves to 314 where the value Count is incremented. The process then moves to 316. If however at 310 it is determined that X (k) is not greater than Max_Drift, the process moves to 316 without incrementing the value of Count. At 316 it is determined if k is equal to m2. If k is not equal to m2, the process moves to 315 where k is incremented and then moves back to 310. At 310 it is then determined if the next X (k) is greater than Max_Drift. The process can repeat 310,314,312 and 315 until each mean of the X (k)'s that is greater than Max_Drift in the m2 X (k)'s has been counted by incrementing the value Count. When it is determined that k equals m2 at 312, the number of X (k)'s greater than Max_Drift has been counted as the value Count and the process then moves to 317.

At 317 it is determined if the value of Count (i.e., the X (k)'s counted at 314 that are greater than Max_Drift) is above a Set_Threshold_Percentage of the total number m2 of X (k)'s. If Count is not above the Set_Threshold_Percentage the process moves to 302 and begins again for a next sample set of time corrections over a next time period. If, however, Count is above the Set_Threshold_Percentage the process moves to 318. At 318 Detector 132 generates an alert to notify data monitoring center users with an indication that the predetermined criteria of the benchmark have been met. The alert may be in any form of message, signal or indication sent to, or indicated to, the data monitoring center 120. For example, the alert could trigger the alarm 122, which could be in the form of a warning light, or other visual or audio indication, that indicates the alert to the network administrators.

While the example embodiment was illustrated using node 106 and node 108, the process of the embodiments may be used to observe time corrections between any master node and slave node in a network and subsequently generate an alert from any node. It should be noted that time corrections at various hops between master and slave nodes in a network may be independent of one another in a connected topology.

In terms of the infrastructure of the present disclosure, nodes 104-116, as well as any master node, slave node, host, or server are network elements (that are synonymous with 'apparatuses' and 'nodes') that can facilitate the network communication activities discussed herein. As used herein in this Specification, the term 'network element' is meant to encompass routers, switches, cable boxes, gateways, bridges, loadbalancers, cellular and WiMAX access concentrators, firewalls, inline service nodes, data monitoring center, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms, communication protocols, and interfaces that allow for the effective exchange of data or information.

In one implementation, any one or more of nodes 104-116 include software to achieve (or to foster) the network communication activities discussed herein. This could include, for example, the implementation of instances of PTP processing 128 and/or detector 132 and/or correction database 120 as shown in FIG. 1B, where these modules interact, perform reciprocating functions, and/or suitably coordinate their activities with peers across the network.

For example, instances of PTP processing 128 and/or detector 132 and/or correction database 120 may be provisioned in a slave node, a master node, in a data monitoring center, in a server, etc. Additionally, each of these elements can have an internal structure (e.g., a processor, a memory element, etc.) to facilitate any of the operations described herein. In other embodiments, these network communication activities may be executed externally to these elements, or included in some other network element to achieve the intended functionality. Alternatively, any of the aforementioned network elements may include software (or reciprocating software) that can coordinate with other network elements in order to achieve the network communication activities described herein. In still other embodiments, one or several devices (e.g., servers) may include any suitable algorithms, hardware, software, components, modules, interfaces, or objects that facilitate the operations discussed herein with respect to energy management, message block generation, and profile management activities.

Furthermore, embodiments of the network elements may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication network 100 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Note that in this Specification, references to various features included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' or "software" as used herein this Specification, can be inclusive of an executable file comprising instructions that can be understood and processed on a computer or processor, and may further include library modules loaded during execution, object files, system files, hardware logic, software logic, or any other executable modules.

It is also important to note that the operations described with reference to the preceding FIGURES illustrate only some of the possible scenarios that may be executed by, or within, the system. Some of these operations may be deleted or removed where appropriate, or may be changed, modified or changed considerably without departing from the scope of the discussed concepts. In addition, the timing of these operations relative to one another may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. Moreover, communication network 100 has been illustrated with reference to particular elements and operations that facilitate the communication process, these elements, and operations may be replaced by any suitable architecture or process that achieves the intended functionality of communication network 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method to be performed by a network node to detect a problem with clock synchronization, the method comprising:
    determining, by the network node, a benchmark value for a clock of the network node, wherein the benchmark value is associated with a first set of plurality of time corrections used to synchronize the clock of the network node in a predetermined network environment;
    generating a plurality of time correction parameters associated with a second set of plurality of time corrections used to synchronize the clock of the network node in an operating network environment;
    determining whether the plurality of time correction parameters meets a predetermined criteria based on the benchmark value; and
    generating an alert if the plurality of time correction parameters meets the predetermined criteria, wherein the alert initiates a determination as to whether synchronization of the clock indicates a potential problem with the network node or the operating network environment.

2. The method of claim 1, wherein the first set and the second set of plurality of time corrections comprises precision time protocol corrections and the network node comprises a precision time protocol slave node.

3. The method of claim 1, wherein the generating an alert comprises transmitting a message that indicates detection of a problem with clock synchronization to a data monitoring center.

4. The method of claim 1, wherein determining the benchmark value includes:
configuring the network node according to the predetermined network environment.

5. The method of claim 4, wherein the configuring the network node comprises configuring the network node with a predetermined set of precision time protocol parameters.

6. The method of claim 1, wherein determining the benchmark value comprises:
calculating a plurality of first mean values, wherein each first mean value is based on a set of the first set of plurality of time corrections used to synchronize the clock of the network node in the predetermined network environment; and
selecting the benchmark value based on the plurality of first mean values, wherein the benchmark value defines a threshold.

7. The method of claim 6, wherein generating the plurality of time correction parameters includes calculating a plurality of second mean values, wherein each second mean value is based on a set of the second set of plurality of time corrections used to synchronize the clock of the network node in the operating network environment.

8. The method of claim 7, wherein determining whether the plurality of time correction parameters meet the predetermined criteria comprises:
determining if a predetermined amount of the plurality of second mean values are outside the threshold.

9. The method of claim 8, wherein the benchmark value defines the threshold as a maximum positive drift time correction and a maximum negative drift time correction.

10. The method of claim 8, wherein the predetermined amount comprises a percentage.

11. The method of claim 8, wherein each first mean value and each second mean value is calculated from a last set of respective plurality of time corrections.

12. An apparatus for detecting a problem with clock synchronization, the apparatus comprising:
one or more processors coupled to a memory, wherein the processor and the memory cooperate such that the apparatus is configured to:
determine a benchmark value for time correction of a clock of the apparatus, wherein the benchmark value is associated with a first set of plurality of time corrections used to synchronize the clock of the apparatus in a predetermined network environment;
generate a plurality of time correction parameters associated with a second set of plurality of time corrections used to synchronize the clock of the apparatus in an operating network environment;
determine whether the plurality of time correction parameters meets a predetermined criteria based on the benchmark value; and
generate an alert if the plurality of time correction parameters meets the predetermined criteria, wherein the alert initiates a determination as to whether synchronization of the clock indicates a potential problem with the network node or the operating network environment.

13. The apparatus of claim 12, wherein the first set and the second set of plurality of time corrections comprise precision time protocol corrections and the apparatus comprises a precision time protocol slave node.

14. The apparatus of claim 12, further configured to generate the alert as a message that indicates detection of a problem with clock synchronization to a data monitoring center.

15. The apparatus of claim 12, when determining the benchmark value, further configured to:
calculate a plurality of first mean values, wherein each first mean value is based on a set of the first set of plurality of time corrections used to synchronize the clock of the apparatus in the predetermined network environment; and
select the benchmark value based on the plurality of first mean values, wherein the benchmark value defines a threshold.

16. The apparatus of claim 15, when generating the plurality of time correction parameters, further configured to calculate a plurality of second mean values, wherein each second mean value is based on a set of the second set of plurality of time correction parameters used to synchronize the clock of the apparatus in the operating network environment.

17. The apparatus of claim 16, when determining whether the plurality of time correction parameters meet the predetermined criteria, further configured to determine if a predetermined amount of the plurality of second mean values are outside the threshold.

18. One or more non-transitory media encoded with logic that includes instructions for execution and when executed by a processor is operable to:
determine a benchmark value for time correction of a clock of a network node, wherein the benchmark value is associated with a first set of plurality of time corrections used to synchronize the clock of the network node in a predetermined network environment;
generate a plurality of time correction parameters associated with a second set of plurality of time corrections used to synchronize the clock of the network node in an operating network environment;
determine whether the plurality of time correction parameters meets a predetermined criteria based on the benchmark value; and
generate an alert if the plurality of time correction parameters meets the predetermined criteria, wherein the alert initiates a determination as to whether synchronization of the clock indicates a potential problem with the network node or the operating network environment.

19. The media of claim 18, wherein the first set and the second set of plurality of time corrections comprise precision time protocol corrections and the network node comprises a precision time protocol slave node.

20. The media of claim 18, when the benchmark value defines a threshold, further operable to determine whether the plurality of time correction parameters meets the predetermined criteria by:
determining if a predetermined amount of the plurality of time correction parameters are outside the threshold.

* * * * *